US009800541B2

(12) United States Patent
Kitamura

(10) Patent No.: US 9,800,541 B2
(45) Date of Patent: Oct. 24, 2017

(54) EXTENSIONS TO ADDRESS UTILIZATION AND NEIGHBOR CACHE PROCESSING FUNCTIONS OF IPV6

(75) Inventor: Hiroshi Kitamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 473 days.

(21) Appl. No.: 13/502,043

(22) PCT Filed: Aug. 18, 2010

(86) PCT No.: PCT/JP2010/005108
§ 371 (c)(1),
(2), (4) Date: Apr. 13, 2012

(87) PCT Pub. No.: WO2011/045885
PCT Pub. Date: Apr. 21, 2011

(65) Prior Publication Data
US 2012/0209996 A1     Aug. 16, 2012

(30) Foreign Application Priority Data
Oct. 16, 2009    (JP) ................................ 2009-239359

(51) Int. Cl.
*H04L 29/12*      (2006.01)

(52) U.S. Cl.
CPC ........ *H04L 61/2046* (2013.01); *H04L 61/103* (2013.01); *H04L 61/6059* (2013.01); *H04L 61/6009* (2013.01)

(58) Field of Classification Search
CPC ... H04L 29/08072; H04L 29/06; H04L 43/00; H04L 12/2602; H04L 41/22
(Continued)

(56) References Cited

U.S. PATENT DOCUMENTS 7,532,582 B2 *   5/2009   Ko ................................ 370/252
2002/0031135 A1    3/2002   Inoue
(Continued)

FOREIGN PATENT DOCUMENTS

JP     2002-94558 A    3/2002
JP     2006-180010 A    7/2006

OTHER PUBLICATIONS

T. Natten et al., Neighbor Discovery for IP Vertion 6 (IPv6), RFD2461, Dec. 1998, pp. 92.*
(Continued)

*Primary Examiner* — Kevin Bates
*Assistant Examiner* — Jeyanath Jeyaratnam
(74) *Attorney, Agent, or Firm* — Sughrue Mion, PLLC

(57) ABSTRACT

Provided is a communication system that includes first and second communication devices operating in conformance with IPv6 requirements, in which the first communication device (100) determines whether an own IP address for communication is utilized or not by monitoring a communication status, generates a response request message requesting a response message to the second communication device when the own IP address is determined to be no longer required, designates the own IP address as a destination of the response message in the response request message, and transmits the response request message to the second communication device (200) during a period when a Neighbor Cache entry related to the own IP address in the second communication device is in STALE state after transition from REACHABLE state.

20 Claims, 10 Drawing Sheets

(58) Field of Classification Search
USPC .......................................................... 709/224
See application file for complete search history.

(56) References Cited

U.S. PATENT DOCUMENTS

2006/0159100 A1* 7/2006 Droms et al. .............. 370/395.2
2007/0280135 A1   12/2007 Syed et al.

OTHER PUBLICATIONS

Narten et al. (RFC 4861 "Neighbor Discovery for IP version 6 (IPv6)").*
Qiu et al. (RFC 5726, 48 pages, Mobile IPv6 Location Privacy Solutions, Internet Research Task Force (IRTF)).*
H. Kitamura et al., "IPv6 Neighbor Cache Update", Internet Draft, Oct. 19, 2009, 8 pgs., draft-kitamura-ipv6-neighbor-cache-update-00.txt.
Hiroshi Kitamura et al., "A Unified Multiplex Communication Architecture to Innovate IP communication Styles", IEICE Technical Report, Mar. 2007, pp. 1-6.
Shingo Ata et al., "Delete and Update Methods for Neighbor Cache in IPv6", IEICE Technical Report, 2010, pp. 423-428, vol. 109, No. 449.
T. Narten et al., "Neighbor Discovery for IP version 6 (IPv6)", Network Working Group, Sep. 2007, RFC4861, 97 pgs.

* cited by examiner

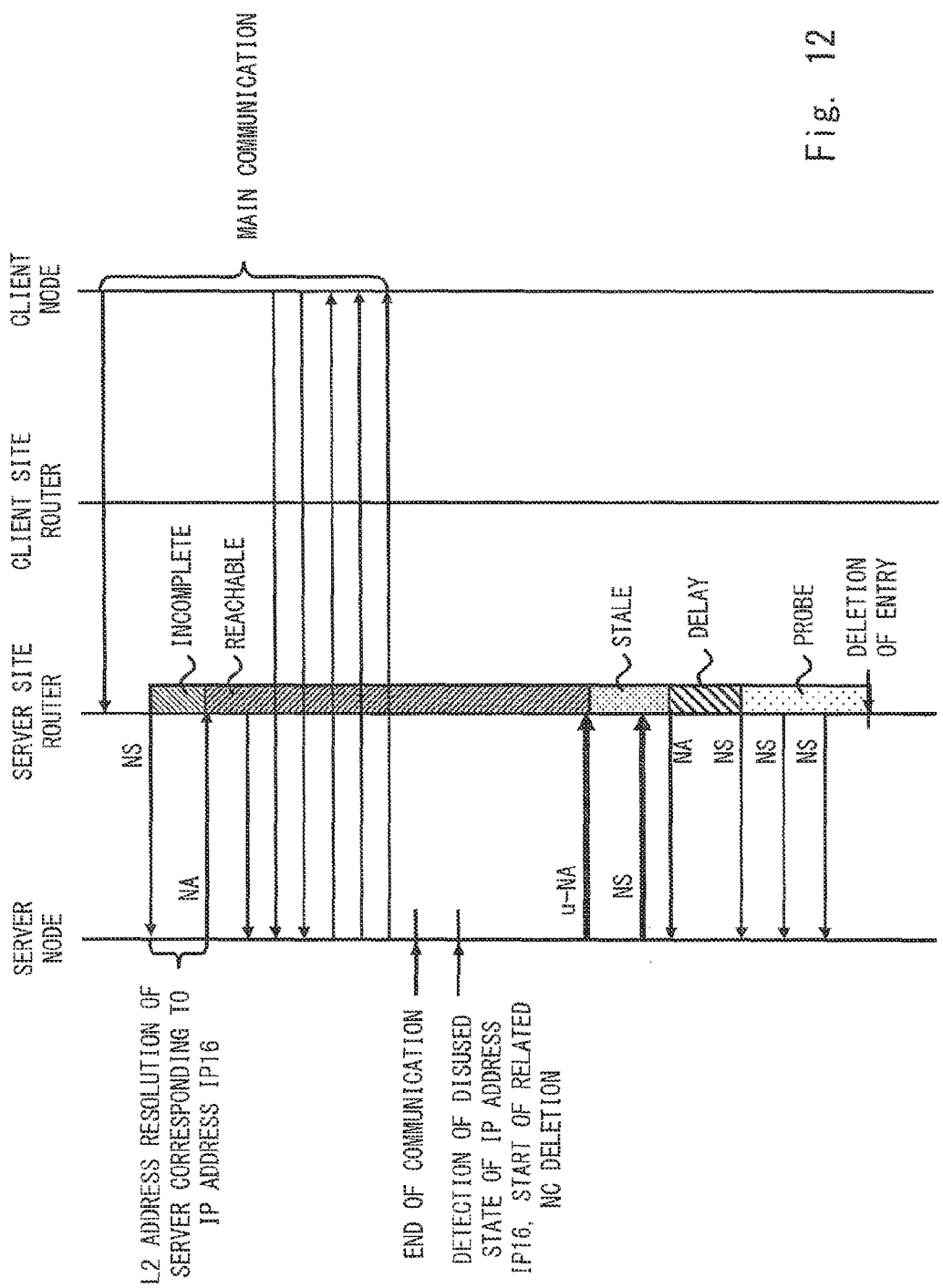

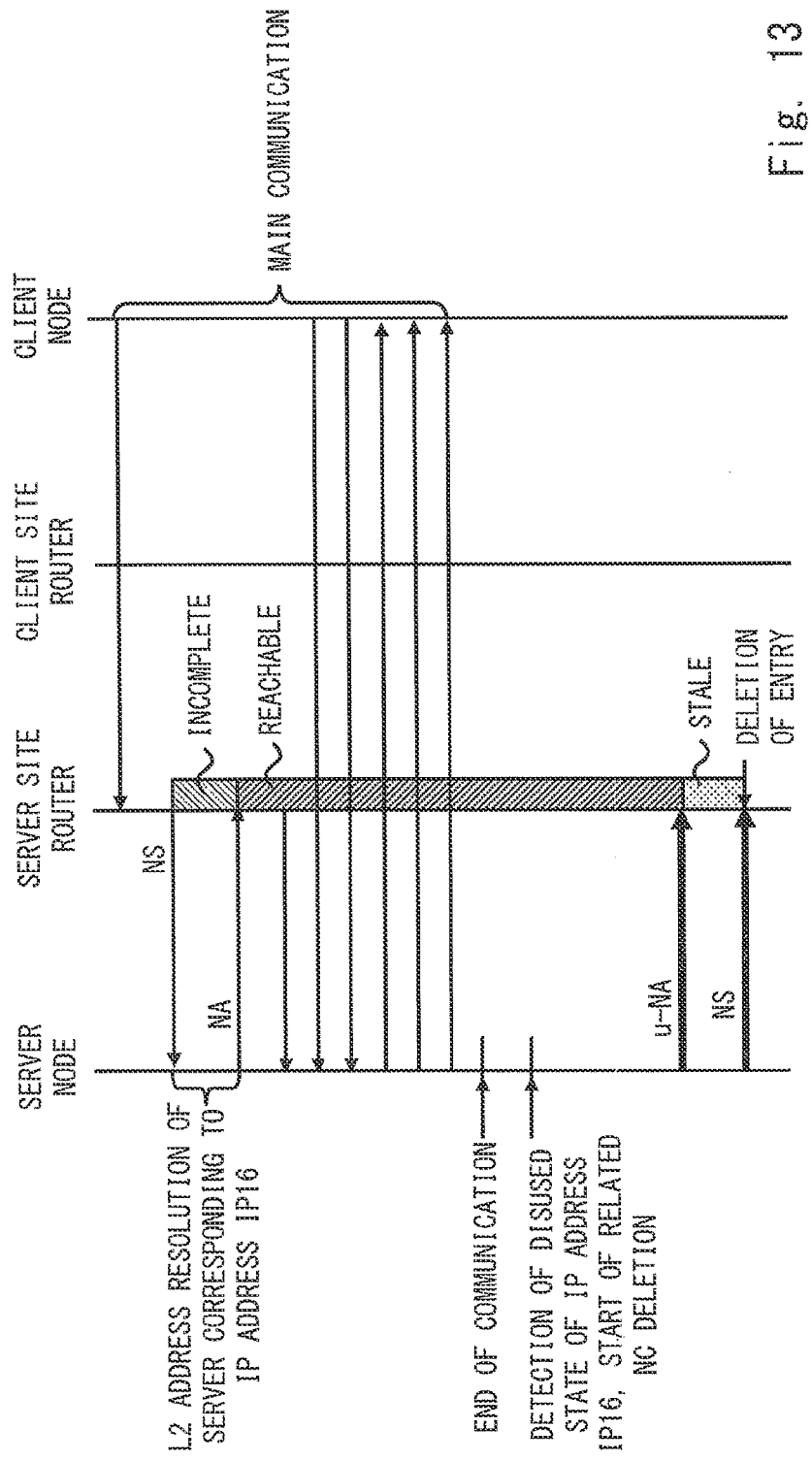

EXTENSIONS TO ADDRESS UTILIZATION AND NEIGHBOR CACHE PROCESSING FUNCTIONS OF IPV6

CROSS REFERENCE TO RELATED APPLICATIONS

This application is a National Stage of International Application No. PCT/JP2010/005108 filed Aug. 18, 2010, claiming priority based on Japanese Patent Application No. 2009239359 filed Oct. 16, 2009, the contents of all of which are incorporated herein by reference in their entirety.

TECHNICAL FIELD

The present invention relates to a communication system, a communication device, a communication control method and a non-transitory computer readable medium and, particularly, to a communication system, a communication device, a communication control method and a non-transitory computer readable medium that conduct address utilization and Neighbor Cache processing among the functions of IPv6 (Internet Protocol version 6).

BACKGROUND ART

In communication using IPv6 (Internet Protocol version 6), Neighbor Cache is used for translation of an IP address (layer 3) and a link layer address (layer 2). A management control method for Neighbor Discovery and Neighbor Cache entry state in Neighbor Cache is described in Non Patent Literature 1 (RFC4861). In existing communication systems using IPv6, a Neighbor Discovery message is used as a message for resolving and managing the correspondence between IP addresses and link layer addresses. Further, Neighbor Cache is used as a table storing the correspondence between IP addresses and link layer addresses. Although the present invention is intended for general communication systems using IPv6, it is a technique that is significantly effective particularly for a communication system in which address update occurs frequently as described in Non Patent Literature 2.

In IPv6, update of Neighbor Cache is typically performed in compliance with RFC4861. However, RFC4861 is lacking in a structure to delete an IP address from Neighbor Cache when the IP address is no longer required. This is because, as the way to use an IP address, permanent use has been common, and it has been rare to encounter the occasion where an IP address becomes no longer required, and even when such a case occurs, it is not recognized, and therefore this problem has not become apparent. However, with the recent proliferation of the mobile communication environment, change of connections is made frequently, occasions to make a terminal enter suspend or sleep mode increase, which causes the state where Neighbor Cache for the terminal no longer used is accumulated to occur. Neighbor Cache not in use leads to network vulnerability and is thus a problem.

In light of this, an example of a management control method of Neighbor Cache that deletes Neighbor Cache no longer used is described in Patent Literature 1. A connection management method described in Patent Literature 1 is the connection management method of a router device that performs connection management of a communication terminal connected to a link in an IP network, which includes a step in which the communication terminal notifies the router device about its own communication status, a step in which when the communication status is notification of a communication disabled state, the router device that has received the notification causes nearby cache (Neighbor Cache) entries around the communication terminal to transition to the communication disabled state, and a step in which when the router device receives a packet addressed to the communication terminal, the router device checks the state of nearby cache entries and, if it is the communication disabled state, immediately transmits the transfer error message to a sender of the packet. The connection management method described in Patent Literature 1 further includes a step in which the communication terminal clears the link connection after giving a notification of the communication disabled state to a first router device and, when the communication terminal connects to a link managed by a second router device, the communication terminal requests the first router device to delete the nearby cache entry. Then, the router device deletes the entry of the communication terminal in the nearby cache after the lapse of a specified period from the receipt of the notification of the communication disabled state from the communication terminal.

CITATION LIST

Patent Literature

[PTL 1] Japanese Unexamined Patent Application Publication No. 2006-180010

Non Patent Literature

[NPL 1] T. Narten, et al., "Neighbor Discovery for IP version 6 (IPv6)", September 2007, RFC4861

[NPL 2] Kitamura, Ata and Murata, "A Unified Multiplex Communication Architecture to Innovate IP Communication Styles", The Institute of Electronics, Information and Communication Engineers, Information networks, March 2007

SUMMARY OF INVENTION

Technical Problem

However, according to the connection management method described in Patent Literature 1, the deletion of a Neighbor Cache entry is done on condition that both of the router device and the communication terminal are compatible with the deletion, and the deletion of a Neighbor Cache entry cannot be done even if either one of the router device and the communication terminal is compatible with the deletion. Thus, the connection management method described in Patent Literature 1 has a problem that it is not widely applicable to general equipment and thus fails to reliably perform Neighbor Cache deletion in communication systems composed of general devices.

In view of the above, an exemplary object of the invention is to promptly and reliably perform deletion of a Neighbor Cache entry by operation at least on the terminal side.

Solution to Problem

A communication system according to one exemplary aspect of the invention is a communication system that includes first and second communication devices operating in conformance with IPv6 requirements, in which the first communication device performs determining whether an own IP address for communication is utilized or not by monitoring a communication status, generating a response request message requesting a response message to the second communication device when the own IP address is determined to be no longer required, designating the own IP address as a destination of the response message in the response request message, and transmitting the response request message to the second communication device during a period when a Neighbor Cache entry related to the own IP address in the second communication device is in STALE state after transition from REACHABLE state.

A communication device according to one exemplary aspect of the invention is a communication device operating in conformance with IPv6 requirements, which includes an IP address utilization state management unit that determines whether an own IP address for communication is utilized or not by monitoring a communication status, and a message generation and transmission unit that generates a response request message requesting a response message to the second communication device when the own IP address is determined to be no longer required, designates the own IP address as a destination of the response message in the response request message, and transmits the response request message to a communication device at the other end during a period when the Neighbor Cache entry related to the own IP address in the communication device at the other end is in STALE state after transition from REACHABLE state.

A communication control method for a communication system according to one exemplary aspect of the invention is a communication control method for a communication system that includes first and second communication devices operating in conformance with IPv6 requirements, which includes, in the first communication device, determining whether an own IP address for communication is utilized or not by monitoring a communication status, generating a response request message requesting a response message to the second communication device when the own IP address is determined to be no longer required, designating the own IP address as a destination of the response message in the response request message, and transmitting the response request message to the second communication device during a period when the Neighbor Cache entry related to the own IP address in the second communication device is in STALE state after transition from REACHABLE state.

A non-transitory computer readable medium according to one exemplary aspect of the invention is a non-transitory computer readable medium storing a communication control program to perform control of a communication device that communicates with a communication device at the other end in conformance with IPv6 requirements, the communication control program executing determining whether an own IP address for communication is utilized or not by monitoring a communication status between the communication device and the communication device at the other end, generating a response request message requesting a response message to the second communication device when the own IP address is determined to be no longer required, designating the own IP address as a destination of the response message in the response request message, and transmitting the Neighbor Solicited message to the communication device at the other end during a period when the Neighbor Cache entry related to the own IP address in the second communication device is in STALE state after transition from REACHABLE state.

Advantageous Effects of Invention

In a communication system, a communication device, a communication control method and a non-transitory computer readable medium according to the present invention, it is possible to promptly and reliably perform deletion of a Neighbor Cache entry by operation at least on the terminal side.

BRIEF DESCRIPTION OF DRAWINGS

FIG. 12 is a sequence chart showing an operation of the communication system according to the fifth exemplary embodiment; and FIG. 13 is a sequence chart showing another example of an operation of the communication system according to the fifth exemplary embodiment.

DESCRIPTION OF EMBODIMENTS

[First Exemplary Embodiment]

Figure 1:
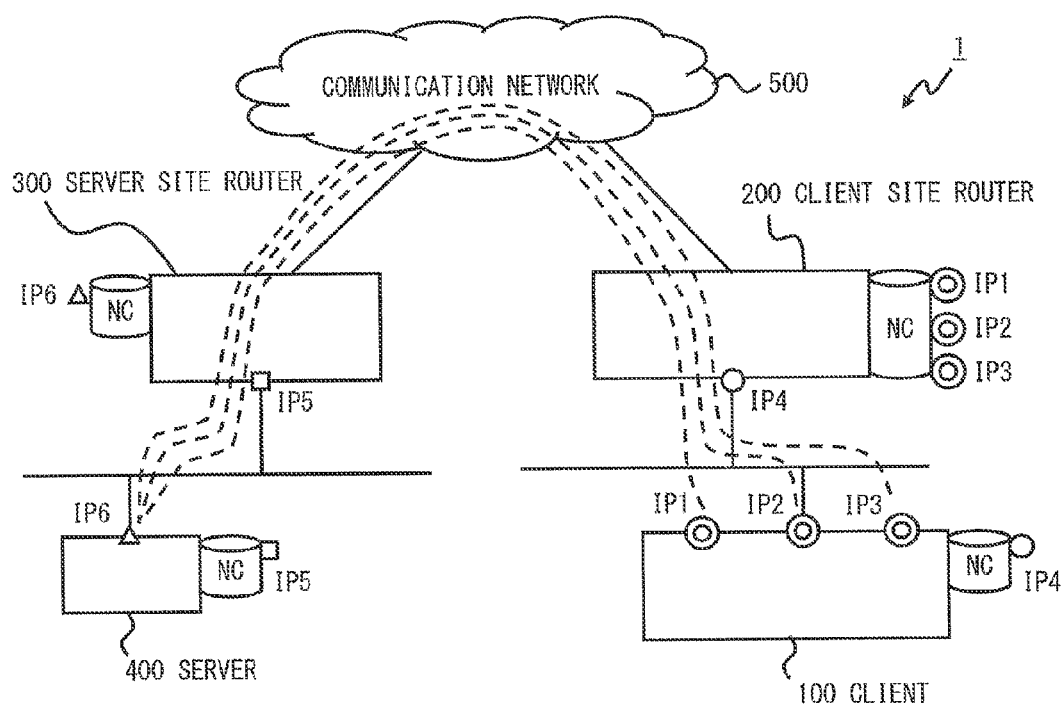
FIG. 1 is a block diagram of a communication system according to a first exemplary embodiment.

Exemplary embodiments of the present invention are described hereinafter with reference to the drawings. FIG. 1 shows a block diagram of a communication system 1 according to a first exemplary embodiment. As shown in FIG. 1, the communication system 1 includes a client device (for example, a client communication node) 100, a client site router 200, a server device (for example, a server site router) 300, and a server communication node 400. Each communication node has Neighbor Cache NC as a table that stores the correspondence between IP addresses (layer 3) and link layer addresses (layer 2). Further, each communication node has a function of processing a message for resolving and managing the correspondence. In the example shown in FIG. 1, it is assumed that the client communication node 100 has three addresses IP1 to IP3, and those addresses are used respectively in three sessions established with the server communication node 400. Further, in the example shown in FIG. 1, the client site router 200 and the server site router 300 are connected through a communication network 500.

Note that, in the first exemplary embodiment, an address IP4 of the client site router 200 is stored in Neighbor Cache NC of the client communication node 100, addresses IP1 to IP3 of the client communication node 100 are stored in Neighbor Cache NC of the client site router 200, an address IP6 of the server communication node 400 is stored in Neighbor Cache NC of the server site router 300, and an address IP5 of the server site router 300 is stored in Neighbor Cache NC of the server communication node 400. Further, in the following description of the exemplary embodiment, a connection management method between a first communication device (for example, the client communication node 100) and a second communication device (for example, the client site router 200) is described. The configurations of the client communication node 100 and the client site router 200 are described in detail in the following description.

Further, in the communication system 1 according to the first exemplary embodiment, an IP address to use is changed from session to session. Furthermore, the communication system 1 has a configuration in which a plurality of IP addresses are assigned to one link layer address (which is hereinafter referred to as L2 address). In the example shown in FIG. 1, the same L2 address is indicated by the same symbol (for example, four L2 addresses indicated by single circle, double circle, triangle and square are shown in the example of FIG. 1). Specifically, in the example shown in FIG. 1, the IP addresses IP1 to IP3 are assigned to a single L2 address in the client communication node 100. Then, in the communication system 1 of FIG. 1, the state where three different sessions (for example, communication paths indicated by dotted lines) using the IP addresses IP1 to IP3 are established is shown. In the communication system 1, a session using a different IP address is established with the server communication node 400 for each application software, for example. Then, in the communication system 1, the IP address that has been used is disabled at the end of the session. By using different IP addresses from session to session in the communication system 1, it is possible to improve the security of the communication system (see Non Patent Literature 2).

In the communication system using different IP addresses from session to session as described above, a large number of entries about IP addresses no longer required are accumulated in Neighbor Cache NC that stores the correspondence between L2 addresses and IP addresses. Therefore, the configuration that can promptly and accurately delete the entries about IP addresses no longer required that are accumulated in Neighbor Cache NC has great significance to make efficient utilization of resources for communication and improve the security of the communication system.

Figure 2:
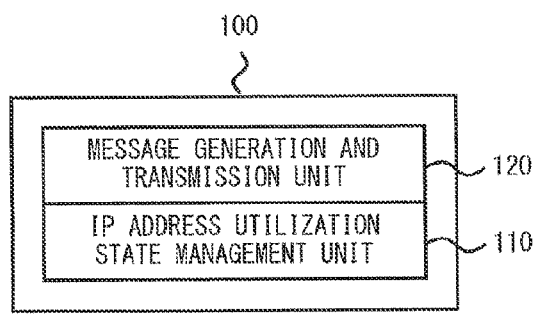
FIG. 2 is a block diagram of a client device according to the first exemplary embodiment.

FIG. 2 shows a block diagram of the client communication node 100. As shown in FIG. 2, the client communication node 100 includes an IP address utilization state management unit 110 and a message generation and transmission unit 120. The IP address utilization state management unit 110 monitors the communication status of the client communication node 100 and determines whether its own IP address to be used for communication is utilized or not. When it is determined in the IP address utilization state management unit 110 that its own IP address is not required, the message generation and transmission unit 120 generates an Unsolicited Neighbor Advertisement (u-NA) message and transmits the message to an adjacent communication device (for example, the client site router 200) that has the Neighbor Cache NC entry for the IP address no longer required in order to reliably cause the state of the Neighbor Cache NC entry for the IP address no longer required that is held by the adjacent communication device (for example, the client site router 200) to transition to STALE state even if it is in REACHABLE state. In the case where it is already known that the entry state of Neighbor Cache NC is STALE state, it is not necessary to transmit the u-NA message. After that, the message generation and transmission unit 120 generates a Neighbor Solicited (NS) message in which the own IP address that is no longer required is set as a sender address and transmits the message to the adjacent communication device that has the Neighbor Cache NC entry for the IP address in order to induce transmission of a packet in reference to the Neighbor Cache NC entry from the adjacent communication device that has the Neighbor Cache NC entry, which consequently leads to deletion of the Neighbor Cache NC entry.

Figure 3:
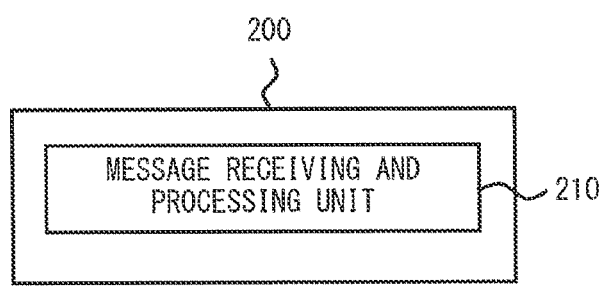
FIG. 3 is a block diagram of a router according to the first exemplary embodiment.

FIG. 3 shows a block diagram of the client site router 200. As shown in FIG. 3, the client site router 200 includes a message receiving and processing unit 210. The message receiving and processing unit 210 causes the Neighbor Cache related to the IP address no longer required of the client communication node 100 stored in its own device to enter STALE state in response to receiving the u-NA message from a communication device at the other end (for example, the client communication node 100). Then, the message receiving and processing unit 210 deletes the Neighbor Cache entry related to the IP address no longer required of the client communication node 100 according to an NS message received from the client communication node 100 after the u-NA message.

Those components operate as follows in outline. When the client communication node 100 is communicating with the server communication node 400 through the client site router 200 and the server site router 300, Neighbor Cache entries related to the IP addresses of the client communication node 100 exist in the Neighbor Cache residing in the client site router 200.

Then, when the client communication node 100 ends the communication session and the IP address that has been used in the session becomes no longer required, the IP address utilization state management unit 110 detects that the IP address that has been used is no longer required. Then, the IP address utilization state management unit 110 notifies the message generation and transmission unit 120 that the IP address is no longer required. Then, the message generation and transmission unit 120 transmits a Neighbor Cache update message in accordance with the algorithm or message of the present invention to the client site router 200 that has the Neighbor Cache entry related to the IP address no longer required in order to delete the Neighbor Cache entry related to the IP address no longer required. Then, the message receiving and processing unit 210 of the client site router 200 receives the message and deletes the Neighbor Cache entry related to the IP address no longer required that exists in the client site router 200.

Figure 4:
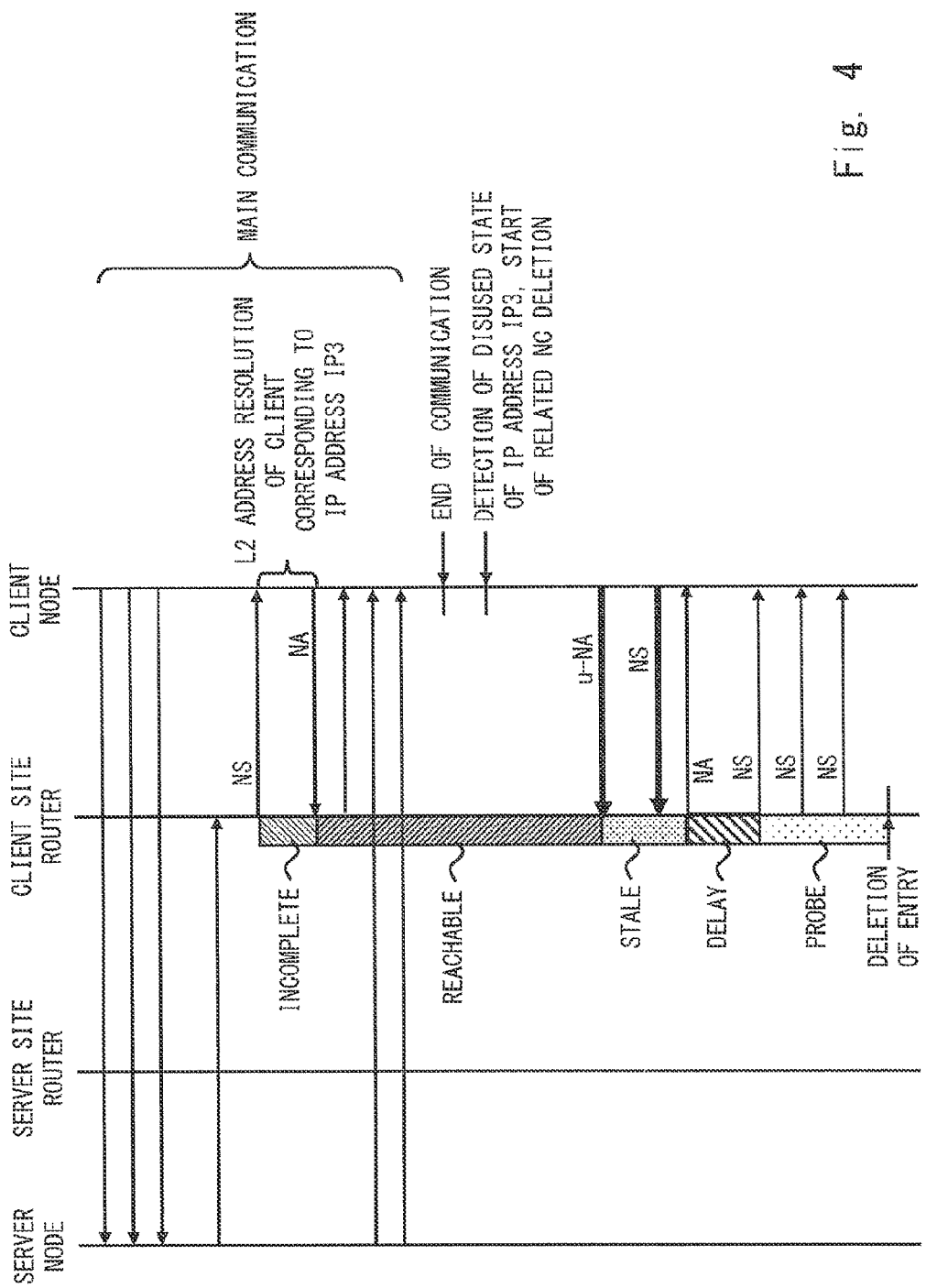
FIG. 4 is a sequence chart showing an operation of the communication system according to the first exemplary embodiment.

FIG. 4 shows a sequence chart showing an operation of the communication system 1 according to the exemplary embodiment. The overall operation of the exemplary embodiment is described in detail with reference to FIG. 4. In the example shown in FIG. 4, it is assumed that sessions using the IP addresses IP1 and IP2 are already established. It is also assumed that an entry related to the IP address IP4 of the client site router 200 with which the client communication node 100 directly communicates is registered in Neighbor Cache NC of the client communication node 100 in a session that has already been conducted. The sequence chart of FIG. 4 shows an example in which a session using the IP address IP3 is initiated. Note that, in the following description, the operation to transmit and receive data packets between the client communication node 100 and the server communication node 400 that is performed during the session is referred to as main communication. Further, when the client communication node 100 does not have a Neighbor Cache NC entry related to the IP address IP4 of the client site router 200, the client communication node 100 creates a Neighbor Cache NC entry related to the IP address IP4 of the client site router 200 and performs L2 address resolution before the main communication is conducted. The entry creation and the L2 address resolution are performed in compliance with RFC4861.

When the session using the IP address IP3 is initiated, the client communication node 100 sends out a data packet to the client site router 200 by using the entry related to the IP address IP4 of its own Neighbor Cache NC. Then, the data packet sent out is transmitted to the server communication node 400 through the client site router 200 and the server site router 300. Then, the server communication node 400 sends out response data to the data packet output from the client communication node 100. The data packet is addressed to the IP address IP3. The data packet output from the server communication node 400 is transmitted to the client site router 200 through the server site router 300.

In the client site router 200, a Neighbor Cache NC entry related to the IP address IP3 to which the received packet is addressed does not exist. Therefore, the client site router 200 creates a Neighbor Cache NC entry related to the IP address IP3 based on the received data packet. However, because the L2 address corresponding to the IP address IP3 is unknown, the created Neighbor Cache NC entry related to the IP address IP3 is in INCOMPLETE state. During the period when the entry is in INCOMPLETE state, a data packet cannot be transmitted to the communication device at the other end (for example, the client communication node 100 using the IP address IP3). Thus, the client site router 200 issues an NS message based on the entry in INCOMPLETE state. Then, when the client communication node 100 receives the issued NS message, the client communication node 100 issues an NA message addressed to the client site router 200 as a response message to the received NS message.

Then, the client site router 200 that has received the NA message issued in response to the NS message causes the Neighbor Cache NC entry related to the IP address IP3 to transition to REACHABLE state. The L2 address of the client communication node 100 corresponding to the IP address IP3 is thereby resolved. Then, after the Neighbor Cache NC entry related to the IP address IP3 enters REACHABLE state, the client site router 200 outputs the data packet addressed to the IP address IP3 of the client communication node 100, which is output from the server communication node 400.

An operation in the case where the main communication ends and the IP address IP3 is no longer required is described hereinbelow. When the main communication ends, the end is detected in the client communication node 100 by IP address utilization state management unit 110. Then, the message generation and transmission unit 120 issues a message to update the state of Neighbor Cache NC at the other end of communication based on the detected state of the IP address utilization state management unit 110. The message that is used to update the NC state at the other end of communication in this exemplary embodiment is u-NA message and NS message.

The message receiving and processing unit 210 of the client site router 200 that has received the u-NA message from the client communication node 100 causes the Neighbor Cache NC entry related to the IP address IP3 to transition from REACHABLE state to STALE state. After that, the message receiving and processing unit 210 of the client site router 200 that has received the NS message from the client communication node 100 causes the Neighbor Cache NC entry related to the IP address IP3 to transition from STALE state to DELAY state. Then, the client site router 200 issues the NS message to the client communication node 100 during the period when the Neighbor Cache NC entry related to the IP address IP3 is in DELAY state. After the period of DELAY state has elapsed, the client site router 200 causes the Neighbor Cache NC entry related to the IP address IP3 to transition to PROBE state and issues the NS message a plurality of times. Then, if there is no response to the NS message from the client communication node 100, the client site router 200 deletes the Neighbor Cache NC entry related to the IP address IP3.

Differences between typical communication using IPv6 and communication using IPv6 according to this exemplary embodiment are described hereinafter in further detail. In the communication system 1 according to this exemplary embodiment, the length of time when a Neighbor Cache NC entry stays in STALE state is shortened. Generally, a duration that a Neighbor Cache NC entry stays in REACHABLE state is about 25 seconds. Thus, the Neighbor Cache NC entry transitions from REACHABLE state to STALE state in about 25 seconds. Further, there is also a duration for STALE state. However, the duration that the Neighbor Cache NC entry stays in STALE state is about one day, which is significantly longer than the length of time during which the other state maintains the current status. Thus, in general, it can be regarded that the entry in STALE state is not practically lost.

Further, even when the client communication node 100 sends out the NS message spontaneously when a Neighbor Cache NC entry is in REACHABLE state, the entry does not transition from STALE state to DELAY state. Thus, in the communication system 1 according to this exemplary embodiment, the u-NA message is first issued by the client communication node 100 in order to reliably change the state of a target Neighbor Cache NC entry into STALE state.

Note that, because it is known that the duration that a Neighbor Cache NC entry stays in REACHABLE state is about 25 seconds, a means to issue the NS message after waiting for the duration using the function of the duration may be employed. However, by issuing the u-NA message, the Neighbor Cache NC entry can be forced to transition from REACHABLE state to STALE state. The u-NA message notifies the client site router 200 having the target Neighbor Cache NC entry that the link layer address (for example, L2 address) corresponding to the IP address no longer required is the address of the client communication node 100. In the communication system 1 according to this exemplary embodiment, the transmission of the u-NA message is performed by the message generation and transmission unit 120 of the client communication node 100.

Note that any method may be used to reliably change the state of a target Neighbor Cache NC entry into STALE state. If it is difficult to wait for the duration of REACHABLE state, the latter method of issuing the u-NA message is used. Further, it is specified in RFC4861 that, REACHABLE state transitions to STALE state without waiting for the end of the duration upon receiving the u-NA message for the corresponding entry. Thus, although the u-NA message is not a message required to cause an entry to transition to STALE state, the entry can reliably transition to STALE state upon arrival of the u-NA message.

State transition of an entry from STALE state to DELAY state is described hereinbelow. Generally, a Neighbor Cache NC entry that has become STALE state after transition from REACHABLE state stays in STALE state unless the client site router 200 outputs a packet using the entry. Further, in typical communication (communication in compliance with RFC4861), a packet is not sent out using the entry if communication in a session using the entry ends, and therefore the Neighbor Cache NC entry related to the IP address no longer required stays in STALE state in typical communication, which raises a problem.

In RFC4861, DELAY state is defined as the next state of STALE state. The duration of DELAY state is about 5 seconds, which is relatively short, and it soon transitions to PROBE state. In PROBE state, the client site router 200 transmits the NS message in order to check whether the entry is a valid entry. When no response is received after sending out the NS message a plurality of times, the client site router 200 determines that the entry is not a valid entry and performs deletion of the entry. This operation is specified by RFC4861.

Thus, in order to delete an entry that is currently in STALE state after transition from REACHABLE state, a packet is spontaneously sent from the node having the Neighbor Cache NC entry in STALE state, and if a response is not made to a NS message that is issued in the following PROBE state, the entry is deleted. Therefore, in the communication system 1 according to this exemplary embodiment, the client communication node 100 issues a response request message that requests the client site router 200 to issue a response message when an IP address becomes no longer required. The communication system 1 according to this exemplary embodiment thereby causes a Neighbor Cache NC entry related to the IP address no longer required in the client communication node 100 from STALE state to DELAY state.

Further, in the communication system 1 according to this exemplary embodiment, as a method to cause the client site router 200 having a target Neighbor Cache NC entry to transmit a packet using the entry, the client communication node 100, which is an external node, sends a response request message that requests the client site router 200 to transmit a packet.

The response request message that requests the client site router 200 to transmit a packet may be any message as long as it can request transmission of a packet using a target entry. For example, if the client communication node 100 sends an ICMP echo request, commonly known as "ping", the client site router 200 sends an ICMP echo reply back. Thus, a method to send the ICMP echo request from the client communication node 100 to the client site router 200 as the message requesting the client site router 200 to transmit a packet is possible. However, some communication devices do not make the ICMP echo reply depending on settings. Accordingly, the method to send out the ICMP echo request is less reliable. In light of this, the communication system 1 according to this exemplary embodiment uses the NS message as the response request message since it is more reliable than sending out the ICMP echo request. It is specified in RFC4861 that the NA message is sent as a response to the NS message, and therefore there is no communication device that does not send the NA message back in response to the NS message.

As another example of the response request message, an error notification message may be used as a response. For example, if a message having a TTL value of 1 is sent, the duration of the TTL comes to an end on the receiving side, and an ICMP Time Exceeded message is sent back to a sender. This is a method in which whether to issue an error notification message depends on the setting of a communication device.

Further, issuance of the NS message in this situation and timing is not specified in RFC4861, and a specific configuration to the communication system 1 according to this exemplary embodiment is provided. An IP address to which inquiries are sent by the NS message is the IP address IP4 of the client site router 200. What is important here is Source Address of the NS message. The Source Address serves as Destination Address of the NA message as a response packet to the NS message.

Thus, in the communication system 1 according to this exemplary embodiment, an IP address no longer required is used as Source Address of the NS message that is transmitted from the client communication node 100. In typical packet generation, because a valid IP address is used as Source Address, an IP address no longer required cannot be used for issuance of a packet as Source Address. Accordingly, a special tool to generate a packet with a low image level is used. Thus, the NS message that is used in the communication system 1 according to this exemplary embodiment is specific to the communication system 1. The above process is performed by the message generation and transmission unit 120 of the client communication node 100.

In the communication system 1 according to this exemplary embodiment, the message generation and transmission unit 120 of the client communication node 100 issues the NS message in which an IP address no longer required is designated as Source Address. The client site router 200 that has received the NS message thereby issues the NA message in which the IP address no longer required is designated as Destination Address to respond to the NS message. At this time, by issuance of a packet using a target Neighbor Cache NC entry, the target Neighbor Cache NC entry transitions from STALE state to DELAY state. Then, when the duration of DELAY state comes to an end, the target entry transitions to PROBE state, and the NS message to check whether the target Neighbor Cache NC entry is valid is issued from the client site router 200.

The destination L2 address of the NS message that is received by the client communication node 100 during the period when the entry is in PROBE state is the address held by the client communication node 100. Therefore, when considered on the basis of the L2 address, the NS message is received by the client communication node 100. However, the destination IP address is the IP address no longer required by the client communication node 100, and the client communication node 100 does not have the IP address. Therefore, when considered on the basis of the IP address, the NS message is not accepted by the client communication node 100. Accordingly, the NA message as a response to the NS message transmitted from the client site router 200 during the period of PROBE state is not issued from the client communication node 100. Further, because the NA message is not sent back in spite of that the NA message is retransmitted a plurality of times, the client site router 200 eventually deletes the corresponding target Neighbor Cache NC entry.

As described above, in the communication system 1 according to this exemplary embodiment, the client communication node 100 detects the state where an IP address is no longer required. Based on the detection result, the client communication node 100 issues the NS message designating the IP address no longer required as a reply address to the client site router 200 during the period when the corresponding entry of he client site router 200 is in STALE state. The client site router 200 can thereby cause the entry transition from STALE state to DELAY state because communication using the entry is performed. Then, the client communication node 100 does not make any response to the processing of the client site router 200 after the entry becomes DELAY state, and therefore the Neighbor Cache NC entry related to the IP address no longer required stored in the client site router 200 is deleted. By such an operation, in the communication system 1 according to this exemplary embodiment, it is possible to promptly and reliably delete the Neighbor Cache NC entry related to the IP address no longer required.

At this time, the above process in the client site router 200 is not a special process, and a regular process specified in RFC 4681. Thus, additional functions to the client site router 200 are not needed to implement the present function, and it can be implemented by adding functions only to the client communication node 100. It is a significant feature providing advantages in promoting widespread usage of the function that the function can be implemented with no need to add functions to the client site router 200.

Further, in the communication system 1 according to this exemplary embodiment, a Neighbor Cache update message (NS message) is issued immediately upon change in utilization state such as that an IP address becomes no longer required. Then, a corresponding Neighbor Cache entry is updated in accordance with the change in the utilization state of the IP address. Thus, even in the situation where the utilization state of an IP address changes frequently, mismatch of Neighbor Cache entry information related to the IP address does not occur, thereby preventing generation of a potential security hole.

Further, the same situation as when an IP address becomes no longer required is encountered in the case where an OS of a communication device enters suspend or sleep mode. In the communication system 1 according to this exemplary embodiment, such a case can be also handled by the same operation as when an IP address becomes no longer required. Specifically, in the case where an OS of a communication device enters suspend or sleep mode, the processing of causing the OS of the communication device to enter suspend or sleep mode leads to the state where an IP address becomes disused after that, although it is not processing of changing the value of the IP address used by the communication device.

[Second Exemplary Embodiment]

Figure 5:
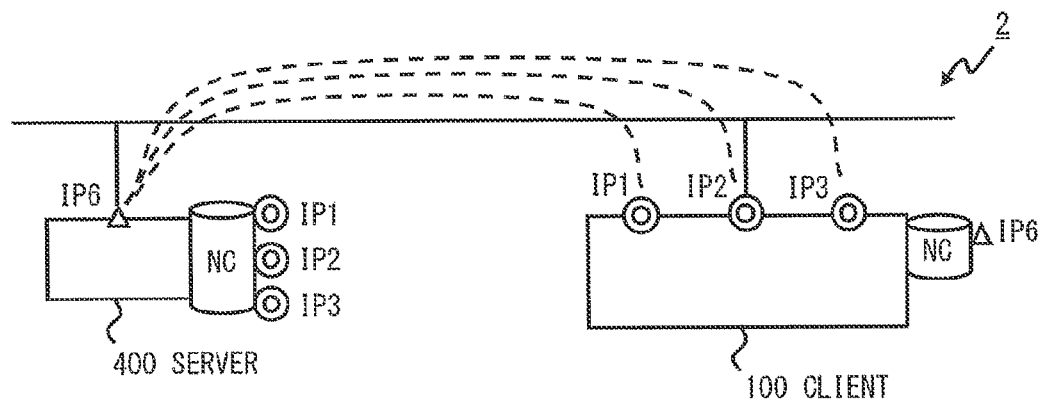
FIG. 5 is a block diagram of a communication system according to a second exemplary embodiment.

FIG. 5 shows a block diagram of a communication system 2 according to a second exemplary embodiment. As shown in FIG. 5, in the communication system 2, the client communication node 100 and the server communication node 400 are connected without through routers. Therefore, in the communication system 2, addresses IP1 to IP3 of the client communication node 100 are stored in Neighbor Cache NC of the server communication node 400, and an address IP6 of the server communication node 400 is stored in Neighbor Cache NC of the client communication node 100.

Figure 6:
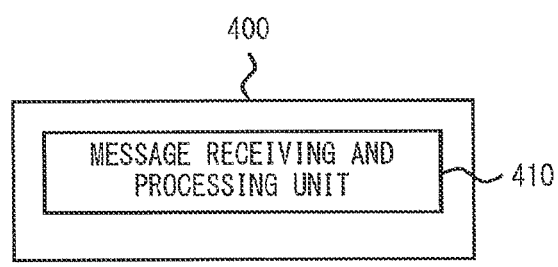
FIG. 6 is a block diagram of a server device according to the second exemplary embodiment.

In the communication system 2, because the server communication node 400 and the client communication node 100 directly communicate with each other, the server communication node 400 includes a message receiving and processing unit 410 that is equivalent of the message receiving and processing unit 210 in the client site router 200. FIG. 6 shows a block diagram of the server communication node 400 that includes the message receiving and processing unit 410.

Figure 7:
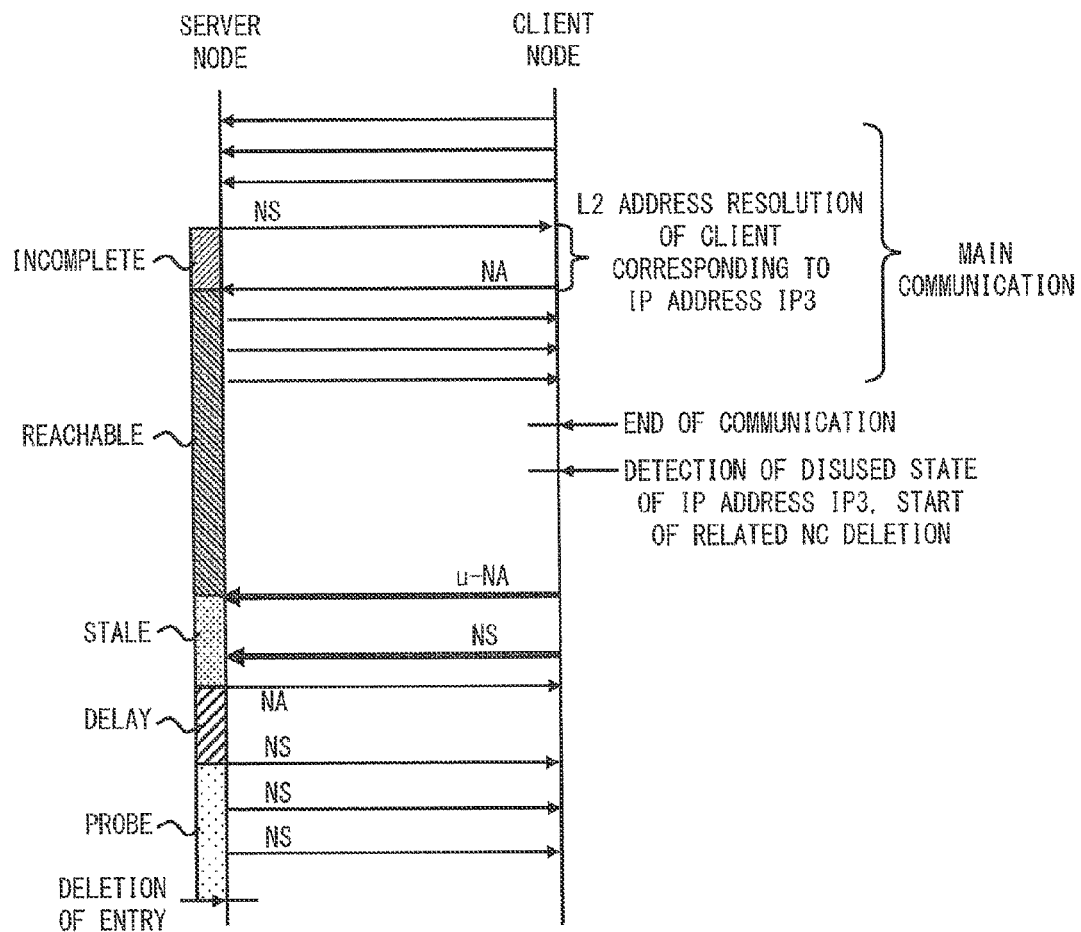
FIG. 7 is a sequence chart showing an operation of the communication system according to the second exemplary embodiment.

FIG. 7 shows a sequence chart of an operation of the communication system 2 according to the second exemplary embodiment. As shown in FIG. 7, in the communication system 2, NA message, NS message and u-NA message are transmitted and received between the server communication node 400 and the client communication node 100. The NA message, NS message and u-NA message in the communication system 2 are the same as the messages transmitted and received between the client communication node 100 and the client site router 200 in the first exemplary embodiment. The server communication node 400 in the communication system 2 transmits and receives the messages by the message receiving and processing unit 410, thereby performing the update process of Neighbor Cache NC in the same manner as in the client site router 200 according to the first exemplary embodiment.

As described above, by transmitting and receiving the NA message, NS message and u-NA message according to the first exemplary embodiment between the client communication node 100 and the server communication node 400, the server communication node 400 can perform the update process of Neighbor Cache NC in the same manner as in the communication system 1 according to the first exemplary embodiment.

[Third Exemplary Embodiment]

Figure 8:
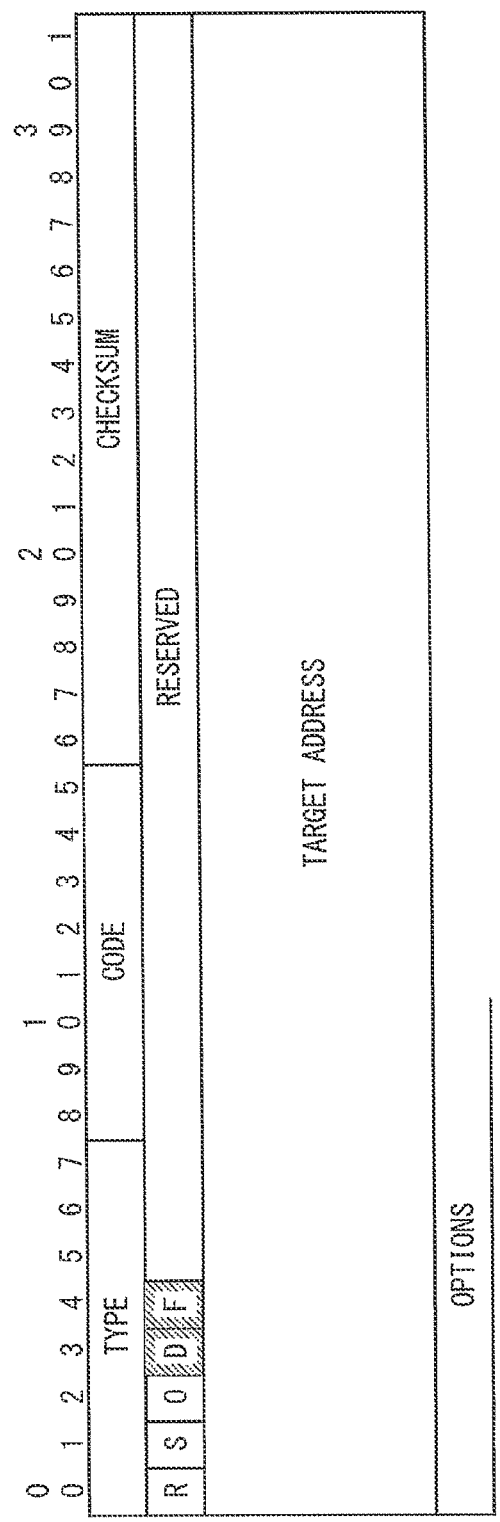
FIG. 8 is a schematic diagram of a data format of an NS message used in a communication system according to a third exemplary embodiment.

In a third exemplary embodiment, deletion of a Neighbor Cache entry related to an IP address no longer required is implemented using an extended NS message. The extended NS message makes explicit designation of an entry deletion process. FIG. 8 shows a schematic diagram of a data format of the NS message that is used in a communication system according to the third exemplary embodiment.

As shown in FIG. 8, a deletion flag D and a force flag F are added in the extended NS message. The deletion flag D indicates whether or not to perform deletion of Neighbor Cache related to an IP address no longer required in a first communication device having the IP address no longer required. The force flag F indicates whether or not to forcibly perform deletion of Neighbor Cache. The extended NS message is generated by a message generation and transmission unit (for example, the client communication node 100 in the first exemplary embodiment) of a communication node that has the IP address no longer required.

Further, in the communication system according to the third exemplary embodiment, when the deletion flag D is set to allow deletion, the NS message indicates designation of normal deletion of a target Neighbor Cache NC entry. The communication node that has received this NS message deletes the target Neighbor Cache NC entry. In the communication system according to the third exemplary embodiment, the entry is deleted when the state of the target Neighbor Cache NC entry is STALE state and the subsequent states, excluding REACHABLE state. The NS message in the state where the force flag F allows forced execution indicates forced processing on a target Neighbor Cache NC entry. In the communication system according to the third exemplary embodiment, the force flag F is used when the deletion flag D is set to allow deletion. In this case, the force flag F and the deletion flag D indicate designation of forced deletion of a target Neighbor Cache NC entry. The communication node that has received this NS message performs deletion when the target Neighbor Cache NC entry is in any state including REACHABLE state.

Figure 9:
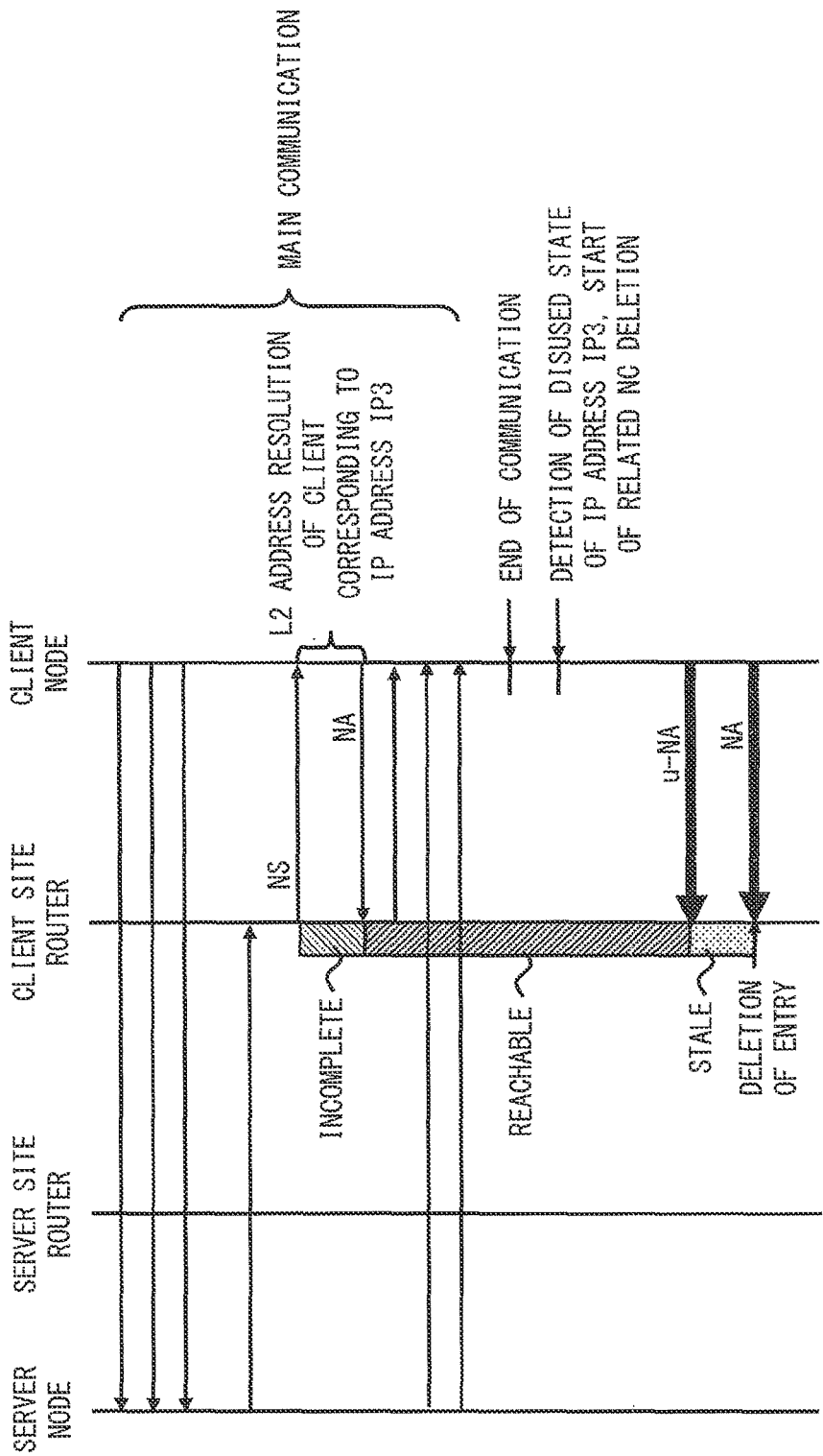
FIG. 9 is a sequence chart showing an operation of the communication system according to the third exemplary embodiment.

FIG. 9 shows a sequence chart of an operation of the communication system according to the third exemplary embodiment. The operation of the communication system according to the third exemplary embodiment is described with reference to FIG. 9. The example of FIG. 9 shows the case where the client communication node 100 sets up a session and communicates with the server communication node 400 existing in a different segment through a router, as in the first exemplary embodiment. In this case, in compliance with RFC4861, the NS message and NA message are issued, and resolution of a L2 address corresponding to an IP address IP3 used for communication is performed. As a result, a Neighbor Cache entry corresponding to the IP address IP3 that is used in the client communication node is created, and main communication is performed. A typical sequence of this process is shown in the upper half of FIG. 9. The detailed operation of this part is the same as the operation of the communication system 1 according to the first exemplary embodiment shown in FIG. 4.

The operation of the communication system according to the third exemplary embodiment in the subsequent sequence is described. In the communication system according to the third exemplary embodiment also, when the IP address IP3 becomes no longer required due to the end of main communication, the IP address utilization state management unit 110 detects that. Then, the IP address utilization state management unit 110 notifies the message generation and transmission unit 120 that the IP address IP3 is no longer required, and the message generation and transmission unit 120 issues a message. As the message to update the state of Neighbor Cache NC of the communication device at the other end (for example, the client site router 200), the u-NA message and the extended NS message are used in the communication system 3 according to the third exemplary embodiment. The extended NS message has two types: one in which only the deletion flag D is set to allow deletion, and the other one in which both the deletion flag D and the force flag F are set to allow deletion.

In the case of using the extended NS message in which only the deletion flag D is set to allow deletion, it is necessary that a target entry of Neighbor Cache NC is not in REACHABLE state. Therefore, in order to reliably change the state of the target Neighbor Cache NC entry into STALE state, a method of waiting until the duration of REACHABLE state comes to an end or a method of issuing the u-NA message is used as in the first exemplary embodiment. Further, in the case of using the extended NS message in which both the deletion flag D and the force flag F are set to allow deletion, the deletion process is performed regardless of the state of the target Neighbor Cache NC entry. Therefore, the pre-processing like the case of using the extended NS message in which only the deletion flag D is set to allow deletion is not needed in this case. However, because REACHABLE state is the state indicating that the entry is valid, it is not a recommended way to forcibly delete the Neighbor Cache NC entry in spite of such a state. Therefore, the use case of using the extended NS message in which only the deletion flag D is set to allow deletion is recommended.

Note that, in the case of communication through routers, the extended NS message is received by the message receiving and processing unit 210 of the client site router 200, and the message receiving and processing unit 210 performs deletion of a Neighbor Cache NC entry according to the NS message. Further, in the case of communication without through routers, the extended NS message is received by the message receiving and processing unit 410 of the server communication node 400, and the message receiving and processing unit 410 performs deletion of a Neighbor Cache NC entry according to the NS message.

Further, as shown in the sequence chart of FIG. 9, in the communication system according to the third exemplary embodiment, the deletion is performed without waiting for transition of the corresponding entry from STALE state to DELAY state. Therefore, in the communication system according to the third exemplary embodiment, the deletion is performed without issuance of a message from the client site router 200 or the server communication node 400.

As described above, in the communication system according to the third exemplary embodiment, with use of the extended NS message, the deletion process can be done faster than in the first and second exemplary embodiments. Further, the communication system according to the third exemplary embodiment has a feature that it is necessary to add a mechanism to perform processing to handle the extended NS message in communication equipment at the other end (for example, the client site router 200, the server communication node 400).

[Fourth Exemplary Embodiment]

A fourth exemplary embodiment is an aspect that makes combined use of the first exemplary embodiment and the third exemplary embodiment. It is specified in RFC4861 that, when the extended NS message used in the third exemplary embodiment is received by the communication node not having the function of interpreting the extended message, the message is just ignored and discarded. Accordingly, no problem occurs if the deletion process of a Neighbor Cache NC entry using the extended NS message used in the third exemplary embodiment is performed on the communication node that does not have the function of interpreting the extended message.

It is generally difficult to determine in advance whether the other end of communication that has a Neighbor Cache NC entry is the communication node not having the function of interpreting the extended message. Thus, in the fourth exemplary embodiment, the deletion process of a Neighbor Cache NC entry using the extended NS message according to the third exemplary embodiment, which involves feature extension but allows fast execution and causes no problem, is performed firstly. After that, the deletion process of a Neighbor Cache NC entry using the entry deletion process of the first exemplary embodiment, which takes a longer processing time than that of the third exemplary embodiment but is effective for all existing communication nodes with no feature extension, is performed.

In the method using the entry deletion process according to the fourth exemplary embodiment, if a Neighbor Cache NC entry is in the communication node that has the function of interpreting the extended message, the deletion of the Neighbor Cache NC entry by the first entry deletion process according to the third exemplary embodiment is performed. If, on the other hand, the other end of communication is the communication node that does not have the function of interpreting the extended message, the extended NS message in the first entry deletion process according to the third exemplary embodiment is ignored without causing any problem, and then the deletion process of the Neighbor Cache NC entry by the entry deletion process according to the first exemplary embodiment is performed after that.

Therefore, the entry deletion process according to the fourth exemplary embodiment allows the entry deletion to be performed by the most efficient method, addressing the issue that it is difficult to determine in advance whether it is a communication node that does not have the function of interpreting the extended message.

[Fifth Exemplary Embodiment]

In the above-described exemplary embodiment, the deletion process of a Neighbor Cache NC entry related to an IP address no longer required in the client communication node 100 is mainly described. However, a technique similar to the entry deletion method according to the above-described exemplary embodiments is also applicable to deletion of a Neighbor Cache NC entry related to an IP address no longer required in the server communication node 400. Thus, a method for deletion of a Neighbor Cache NC entry related to an IP address no longer required in the server communication node 400 is described in a fifth exemplary embodiment.

Figure 10:
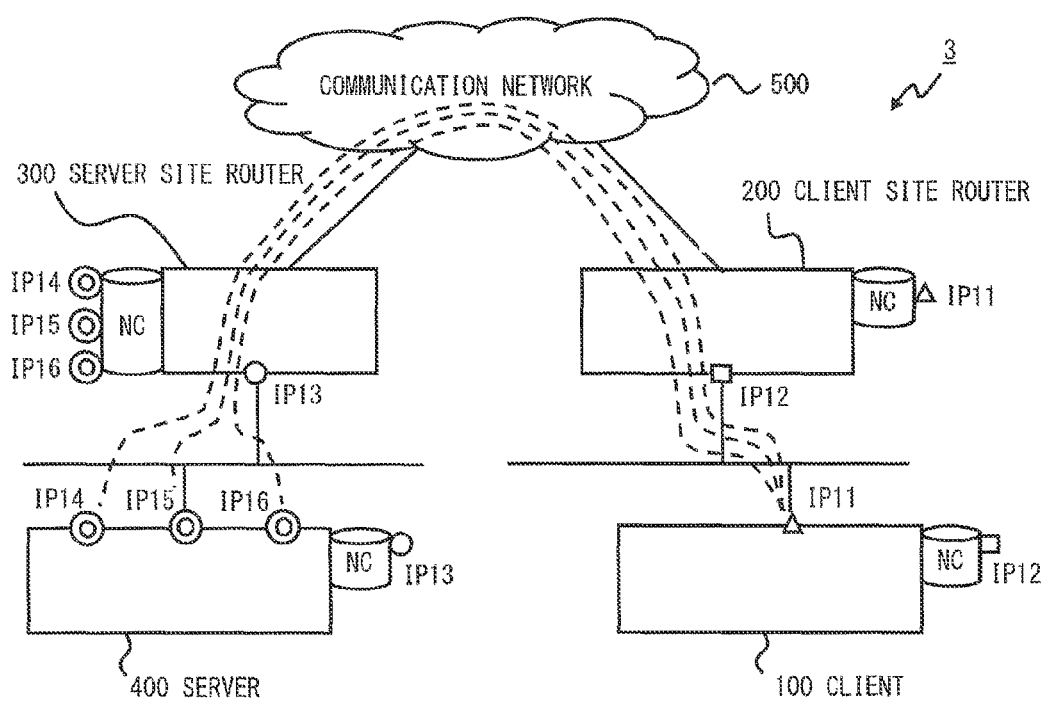
FIG. 10 is a block diagram of a communication system according to a fifth exemplary embodiment.

First, FIG. 10 shows a block diagram of a communication system 3 in the case of performing communication with the client communication node 100 through routers. In the example shown in FIG. 10, the client communication node 100 has an address IP11, the client site router 200 has an address IP12, the server site router 300 has an address IP13, and the server communication node 400 has addresses IP14 to IP16. Further, the address IP12 of the client site router 200 is stored in Neighbor Cache NC of the client communication node 100, and the address IP11 of the client communication node 100 is stored in Neighbor Cache NC of the client site router 200. The client site router 200 is connected with the server site router 300 through the communication network 500. The addresses IP14 to IP16 of the server communication node 400 are stored in Neighbor Cache NC of the server site router 300, and the address IP13 of the server site router 300 is stored in Neighbor Cache NC of the server communication node 400.

Figure 11:
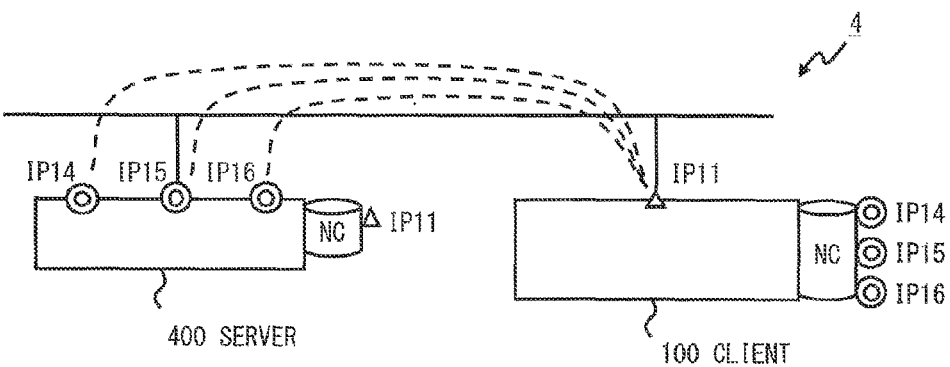
FIG. 11 is a block diagram showing another example of a communication system according to the fifth exemplary embodiment.

FIG. 11 shows a block diagram of a communication system 4 in the case of performing communication with the client communication node 100 without through routers. In the example shown in FIG. 11, the client communication node 100 has an address IP11, and the server communication node 400 has addresses IP14 to IP16. Further, the addresses IP14 to IP16 of the server communication node 400 are stored in Neighbor Cache NC of the client communication node 100, and the address IP11 of the client communication node 100 is stored in Neighbor Cache NC of the server communication node 400.

Note that, in the communication systems shown in FIGS. 10 and 11, different sessions are established for each of IP addresses, as in the communication system shown in FIG. 1 or 5.

Although registration and deletion of a Neighbor Cache NC entry in the case of performing communication through routers, which is shown in FIG. 10, are mainly described in the following description, registration and deletion of a Neighbor Cache NC entry in the communication system 4 shown in FIG. 11 can be described by that the processing of the server site router 300 described hereinbelow is perfumed by the client communication node 100.

FIG. 12 shows a sequence chart of registration and deletion of a Neighbor Cache NC entry of the communication system 3 shown in FIG. 10. In the example shown in FIG. 12, it is assumed that sessions using the IP addresses IP14 and IP15 are already established. It is also assumed that an entry related to the IP address IP13 of the server site router 300 with which the server communication node 400 directly communicates is registered in the Neighbor Cache NC of the server communication node 400 in a session that has already been conducted. The sequence chart of FIG. 12 shows an example in which a session using the IP address IP16 is initiated.

As shown in FIG. 12, when the session using the IP address IP16 is initiated, the client communication node 100 outputs a data packet addressed to the IP address 16. The data packet is transmitted to the server site router 300 through the client site router 200. In the server site router 300, a Neighbor Cache NC entry related to the IP address IP16 to which the received packet is addressed does not exist. Therefore, the server site router 300 creates a Neighbor Cache NC entry related to the IP address IP16 based on the received data packet. However, because the L2 address corresponding to the IP address IP16 is unknown, the created Neighbor Cache NC entry related to the IP address IP16 is in INCOMPLETE state. During the period when the entry is in INCOMPLETE state, a data packet cannot be transmitted to the communication device at the other end (for example, the server communication node 400 using the IP address IP16). Thus, the server site router 300 issues an NS message based on the entry in INCOMPLETE state. Then, when the server communication node 400 receives the issued NS message, the server communication node 400 issues an NA message addressed to the server site router 300 as a response message to the received NS message.

Then, the server site router 300 that has received the NA message issued in response to the NS message causes the Neighbor Cache NC entry related to the IP address IP16 to transition to REACHABLE state. The L2 address of the server communication node 400 corresponding to the IP address IP16 is thereby resolved. Then, after the Neighbor Cache NC entry related to the IP address IP16 enters REACHABLE state, the server site router 300 outputs the data packet addressed to the IP address IP16 of the server communication node 400, which is output from the client communication node 100.

Then, the server communication node 400 outputs a data packet addressed to the IP address IP11 of the client communication node 100 in response to the received data packet. At this time, a Neighbor Cache NC entry related to the IP address IP13 of the server site router 300 already exists in the server communication node 400. Therefore, the server communication node 400 outputs a data packet to the server site router 300 using the Neighbor Cache NC entry. Further, the server site router 300 transmits the data packet output from the server communication node 400 to the client communication node 100.

After that, when the main communication ends, in the server communication node 400, an IP address utilization state management unit (which is equivalent of the IP address utilization state management unit 110 of the client communication node 100) of the server communication node 400 detects that the IP address is no longer required. Then, based on the detection result by the IP address utilization state management unit, a message generation and transmission unit (which is equivalent of the message generation and transmission unit 120 of the client communication node 100) of the server communication node 400 issues the u-NA message to the server site router 300. As a result, in the server site router 300, the Neighbor Cache NC entry related to the IP address no longer required in the server communication node 400 transitions from REACHABLE state to STALE state.

After that, the message generation and transmission unit of the server communication node 400 issues the NS message addressed to the IP address no longer required to the server site router 300. In response to the NS message, the server site router 300 issues the NA message designating the IP address no longer required in the server communication node 400 as a destination. The Neighbor Cache NC entry related to the IP address no longer required in the server communication node 400 thereby transitions to DELAY state. Then, when the duration that the entry stays in DELAY state comes to an end, the server site router 300 issues the NS message addressed to the IP address no longer required in the server communication node 400 a plurality of times. Because the NS message is addressed to the IP address no longer required, the server communication node 400 does not respond to the NS message. Accordingly, the server site router 300 deletes the corresponding Neighbor Cache NC entry, recognizing that it is no longer required.

The above deletion operation is substantially the same as the entry deletion process in the first exemplary embodiment. This means that the entry deletion process described in the first exemplary embodiment can achieve prompt and reliable deletion of a Neighbor Cache NC entry for the server communication node 400 as well.

FIG. 13 shows a sequence chart in the case where the entry deletion process according to the third exemplary embodiment is applied to the communication system 3 shown in FIG. 10. As shown in FIG. 13, in this case, the main communication operates in the same way as the operation sequence shown in FIG. 12. When the main communication ends, in the server communication node 400, an IP address utilization state management unit (which is equivalent of the IP address utilization state management unit 110 of the client communication node 100) of the server communication node 400 detects that the IP address is no longer required. Then, based on the detection result by the IP address utilization state management unit, a message generation and transmission unit (which is equivalent of the message generation and transmission unit 120 of the client communication node 100) of the server communication node 400 issues the u-NA message to the server site router 300. As a result, in the server site router 300, the Neighbor Cache NC entry related to the IP address no longer required in the server communication node 400 transitions from REACHABLE state to STALE state.

After that, the message generation and transmission unit of the server communication node 400 issues the NS message designating the IP address no longer required as a reply address to the server site router 300. The NS message is the extended NS message described in the third exemplary embodiment. At this time, in the example shown in FIG. 13, the NS message contains the deletion flag D and the force flag F. When the deletion flag D of the NS message transmitted from the server communication node 400 is set to allow deletion, the server site router 300 deletes the Neighbor Cache NC entry related to the IP address no longer required in the server communication node 400 without making it transition to DELAY state.

As described above, the deletion method for a Neighbor Cache NC entry described in the first and third exemplary embodiments can be applied also to the server communication node 400. Thus, the entry deletion method according to the present invention is applicable to any communication node that has a Neighbor Cache NC entry, and the communication system to which the entry deletion method according to the present invention is applied can promptly and reliably delete a Neighbor Cache NC entry related to an IP address no longer required. Note that the technique that makes combined use of the entry deletion methods according to the first and third exemplary embodiments which is described in the fourth exemplary embodiment is also applicable to any communication node.

The present invention is not limited to the exemplary embodiments described above, and various changes in form and details may be made therein without departing from the spirit and scope of the present invention. Although the process of deleting a Neighbor Cache entry is mainly described in the above exemplary embodiments, the entry deletion process is an example of the process of updating a Neighbor Cache entry. Thus, the present invention may be applied to the update process including deletion of a Neighbor Cache entry.

Although the present invention is described as a configuration of hardware in the above-described exemplary embodiments, the present invention is not limited thereto. In the present invention, the processes shown in FIGS. 4, 7, 9, 12 and 13 may be implemented by causing a CPU (Central Processing Unit) to execute a communication control program. Further, the communication control program can be stored and provided to a computer using any type of non-transitory computer readable medium. The non-transitory computer readable medium includes any type of tangible storage medium. Examples of the non-transitory computer readable medium include a magnetic storage medium (such as a floppy disk, magnetic tape, hard disk drive, etc.), an optical magnetic storage medium (e.g. a magneto-optical disk), CD-ROM (Read Only Memory), CD-R, CD-R/W, and a semiconductor memory (such as a mask ROM, PROM (Programmable ROM), EPROM (Erasable PROM), flash ROM, RAM (Random Access Memory), etc.). Further, the programs may be provided to a computer using any type of transitory computer readable medium. Examples of the transitory computer readable medium include an electric signal, an optical signal, and an electromagnetic wave. The transitory computer readable medium can provide the program to a computer via a wired communication line such as electric wire or an optical fiber or a wireless communication line.

This application is based upon and claims the benefit of priority from Japanese patent application No. 2009-239359, filed on Oct. 16, 2009, the disclosure of which is incorporated herein in its entirety by reference.

REFERENCE SIGNS LIST 1 to 4 COMMUNICATION SYSTEM
100 CLIENT COMMUNICATION NODE
110 IP ADDRESS UTILIZATION STATE MANAGEMENT UNIT
120 MESSAGE GENERATION AND TRANSMISSION UNIT
200 CLIENT SITE ROUTER
210 MESSAGE RECEIVING AND PROCESSING UNIT
300 SERVER SITE ROUTER
400 SERVER COMMUNICATION NODE

The invention claimed is:

1. A communication system that includes first and second communication devices operating in conformance with IPv6 requirements, wherein the first communication device is configured to perform:
    determining whether an own IP address for communication is utilized or not by monitoring a communication status;
    generating a response request message when the own IP address is determined to be no longer required, a response message to the response request message being obligated to be transmitted to the second communication device under an RFC4861 specification;
    designating the own IP address as a destination of the response message in the response request message; and
    transmitting the response request message to the second communication device during a period when a Neighbor Cache entry related to the own IP address in the second communication device is in STALE state after transition from REACHABLE state, thereby making the second communication device transmit the response message addressed to the own IP address, and thereby changing the Neighbor Cache entry from the STALE state to a DELAY state.

2. The communication system according to claim 1, wherein the first communication device is configured to perform:
   determining whether an own IP address for communication is utilized or not by monitoring a communication status;
   generating the response request message when the own IP address is determined to be no longer required; and
   transmitting the response request message to the second communication device.

3. The communication system according to claim 1, wherein the response request message is a Neighbor Solicited message with the own IP address written in a source address field.

4. The communication system according to claim 1, wherein the first communication device is configured to transmit an Unsolicited Neighbor Advertisement message to the second communication device before transmitting the response request message.

5. The communication system according to claim 3, wherein the Neighbor Solicited message has a deletion flag indicating whether to enable deletion of a Neighbor Cache related to the own IP address.

6. The communication system according to claim 5, wherein when the deletion flag is set to allow deletion of a Neighbor Cache, the second communication device is configured to delete the Neighbor Cache entry related to the own IP address without waiting for the Neighbor Cache entry related to the own IP address to transition to DELAY state.

7. A communication device operating in conformance with IPv6 requirements, wherein the communication device is configured to perform:
   determining whether an own IP address for communication is utilized or not by monitoring a communication status; and
   generating a response request message when the own IP address is determined to be no longer required; and
   transmitting the response request message to a communication device at the other end during a period when the Neighbor Cache entry related to the own IP address in the communication device at the other end is in STALE state after transition from REACHABLE state, thereby making the communication device at the other end transmit a response message addressed to the own IP address, and thereby changing the Neighbor Cache entry from the STALE state to a DELAY state, the response message to the response request message being obligated to be transmitted under an RFC4861 specification, a destination of the response message to the response request message being the own IP address.

8. The communication device according to claim 7, wherein the response request message is a Neighbor Solicited message with the own IP address written in a source address field.

9. The communication device according to claim 7, wherein the communication device is configured to transmit an Unsolicited Neighbor Advertisement message to the communication device at the other end before transmitting the response request message.

10. The communication device according to claim 8, wherein
   the Neighbor Solicited message has a deletion flag indicating whether to enable deletion of the Neighbor Cache entry related to the own IP address, and when the deletion flag is set to allow deletion of a Neighbor Cache, the communication device at the other end is configured to delete the Neighbor Cache related to the communication device without waiting for the Neighbor Cache entry related to the own IP address to transition to DELAY state.

11. A communication control method for a communication system that includes first and second communication devices operating in conformance with IPv6 requirements, comprising, in the first communication device,
   determining whether an own IP address for communication is utilized or not by monitoring a communication status;
   generating a response request message when the own IP address is determined to be no longer required, a response message to the response request message being obligated to be transmitted to the second communication device under an RFC4861 specification;
   designating the own IP address as a destination of the response message in the response request message; and
   transmitting the response request message to the second communication device during a period when the Neighbor Cache entry related to the own IP address in the second communication device is in STALE state after transition from REACHABLE state, thereby making the second communication device transmit the response message addressed to the own IP address, and thereby changing the Neighbor Cache entry from the STALE state to a DELAY state.

12. The communication control method for a communication system according to claim 11, wherein the response request message is a Neighbor Solicited message with the own IP address written in a source address field.

13. The communication control method for a communication system according to claim 11, wherein an Unsolicited Neighbor Advertisement message is transmitted from the first communication device to the second communication device before transmitting the response request message.

14. The communication control method for a communication system according to claim 12, wherein the Neighbor Solicited message has a deletion flag indicating whether to enable deletion of a Neighbor Cache related to the own IP address.

15. The communication control method for a communication system according to claim 14, wherein in the second communication device, when the deletion flag is set to allow deletion of a Neighbor Cache, the Neighbor Cache related to the first communication device is deleted without waiting for the Neighbor Cache entry related to the own IP address to transition to DELAY state.

16. A non-transitory computer readable medium storing a communication control program to perform control of a communication device that communicates with a communication device at the other end in conformance with Ipv6 requirements, the communication control program executing:
   determining whether an own IP address for communication is utilized or not by monitoring a communication status between the communication device and the communication device at the other end;
   generating a response request message when the own IP address is determined to be no longer required, a response message to the response request message being obligated to be transmitted to the second communication device under an RFC4861 specification;
   designating the own IP address as a destination of the response message in the response request message; and transmitting the Neighbor Solicited message to the communication device at the other end during a period when the Neighbor Cache entry related to the own IP address in the communication device is in STALE state after transition from REACHABLE state, thereby making the second communication device transmit the response message addressed to the own IP address, and thereby changing the Neighbor Cache entry from the STALE state to a DELAY state.

17. The non-transitory computer readable medium according to claim 16, wherein the response request message is a Neighbor Solicited message with the own IP address written in a source address field.

18. The non-transitory computer readable medium according to claim 16, wherein in the communication device, an Unsolicited Neighbor Advertisement message is transmitted to the communication device at the other end before transmitting the response request message.

19. The non-transitory computer readable medium according to claim 17, wherein the Neighbor Solicited message has a deletion flag indicating whether to enable deletion of a Neighbor Cache related to the own IP address.

20. The non-transitory computer readable medium according to claim 19, wherein in the communication device at the other end, when the deletion flag is set to allow deletion of a Neighbor Cache, the Neighbor Cache related to the communication device is deleted without waiting for the Neighbor Cache entry related to the own IP address to transition to DELAY state.

* * * * *